(12) United States Patent
Hernandez et al.

(10) Patent No.: US 11,988,639 B2
(45) Date of Patent: May 21, 2024

(54) METHOD AND APPARATUS FOR INSPECTING MARINE RISERS

(71) Applicant: Quest Integrity Group, LLC, Sugar Land, TX (US)

(72) Inventors: Fernando Castro Hernandez, Houston, TX (US); Stefan Papenfuss, Sugarland, TX (US)

(73) Assignee: QUEST INTEGRITY GROUP, LLC, Stafford, TX (US)

( * ) Notice: Subject to any disclaimer, the term of this patent is extended or adjusted under 35 U.S.C. 154(b) by 39 days.

(21) Appl. No.: 17/793,598

(22) PCT Filed: Jan. 20, 2021

(86) PCT No.: PCT/US2021/014191
§ 371 (c)(1),
(2) Date: Jul. 18, 2022

(87) PCT Pub. No.: WO2021/150615
PCT Pub. Date: Jul. 29, 2021

(65) Prior Publication Data
US 2023/0143796 A1    May 11, 2023

Related U.S. Application Data

(60) Provisional application No. 62/963,705, filed on Jan. 21, 2020.

(51) Int. Cl.
*E21B 47/085* (2012.01)
*E21B 17/01* (2006.01)
(Continued)

(52) U.S. Cl.
CPC .............. *G01N 29/07* (2013.01); *E21B 17/01* (2013.01); *E21B 47/085* (2020.05);
(Continued)

(58) Field of Classification Search
CPC .......... E21B 47/085; E21B 17/01; C09K 8/14
(Continued)

(56) References Cited

U.S. PATENT DOCUMENTS 6,904,818 B2   6/2005  Harthorn et al.
7,234,347 B2   6/2007  Harthorn et al.
(Continued)

OTHER PUBLICATIONS

International Search Report and Written Opinion in related application PCT/US2021/014191 dated Apr. 2, 2021.
(Continued)

*Primary Examiner* — Zakiya W Bates
*Assistant Examiner* — Ashish K Varma
(74) *Attorney, Agent, or Firm* — Patterson + Sheridan, LLP (57) ABSTRACT

A method and device for inspecting marine risers is described. The marine riser is deployed from a floating unit and connected to a lower marine riser package (LMRP) and a blow-out prevention (BOP) stack, and the method comprises: performing a first riser inspection with an inspection tool where the marine riser is in an unconnected well configuration, wherein the inspection tool includes an ultrasonic transducer device, and the first riser inspection comprises: conveying the inspection tool in an internal diameter of the marine riser, detecting information on the marine riser with the inspection tool while conveying the inspection tool through the marine riser, and collecting data with the inspection tool corresponding to the information detected by the inspection tool.

20 Claims, 10 Drawing Sheets

(51) Int. Cl.
  *G01N 29/07*   (2006.01)
  *G01N 29/22*   (2006.01)
  *G01N 29/265*   (2006.01)

(52) U.S. Cl.
  CPC ......... *G01N 29/225* (2013.01); *G01N 29/265* (2013.01); *G01N 2291/02854* (2013.01); *G01N 2291/0289* (2013.01); *G01N 2291/106* (2013.01)

(58) Field of Classification Search
  USPC .................................................... 166/250.01
  See application file for complete search history.

(56) References Cited

U.S. PATENT DOCUMENTS

| | | |
|---|---|---|
| 7,698,937 B2 | 4/2010 | Neidhardt |
| 2003/0188589 A1 | 10/2003 | Harthorn et al. |
| 2004/0177681 A1* | 9/2004 | Harthorn ................ G01N 29/28 |
| | | 73/598 |
| 2006/0157239 A1* | 7/2006 | Ramos .................. E21B 47/135 |
| | | 166/254.2 |
| 2015/0315867 A1* | 11/2015 | Caldwell ............... E21B 33/038 |
| | | 166/345 |
| 2017/0298701 A1 | 10/2017 | DeBerry et al. |
| 2018/0178256 A1* | 6/2018 | Donovan ............. G01N 29/265 |
| 2019/0156450 A1* | 5/2019 | Dighe .................. G06Q 50/265 |

OTHER PUBLICATIONS

European Search Report in related application EP 21744477.7-1001 dated Mar. 13, 2023.

* cited by examiner

METHOD AND APPARATUS FOR INSPECTING MARINE RISERS

CROSS-REFERENCE TO RELATED APPLICATION

The present document is based on and claims priority to U.S. Provisional Application Ser. No. 62/963,705, filed Jan. 21, 2020, which is incorporated herein by reference in its entirety.

FIELD OF INVENTION

In general, the present disclosure relates to detecting defects in marine risers used in subsea drilling and production operations while the marine riser is deployed and in situ. More specifically, the present disclosure relates to an inspection method and system for inspecting a marine riser with an ultrasonic device while the marine riser is deployed from a vessel.

BACKGROUND OF INVENTION

Non-destructive inspection of pipes has been performed on pipes using an inspection device having ultrasonic transducers. For offshore applications, marine risers are a type of pipe that may be used for well operations: drilling, completions, workovers, and plug-and-abandon operations. Marine risers are attached to a floating unit, such as a drilling vessel or platform, in a water column. The marine riser may be deployed into the water column in a deployed orientation where the marine riser extends from the floating unit into the water column. Lengthwise, marine risers may be comprised of multiple sections (e.g. 90 foot sections), and these riser sections together can extend for thousands of feet through the water column to the wellhead on the seafloor. The deployed drilling marine riser may be connected at its distal end to a lower marine riser package ("LMRP") and the LMRP may be releasably connected to a blowout preventer ("BOP"). The BOP may be latched to the wellhead on the seafloor so that the marine riser extends between the floating unit and the BOP attached to the wellhead.

Marine risers contain fluids, solids, and gases that flow between the floating unit and the wellhead during offshore operations, and ensure that any pressurized medium (oil, gas, solids, caustic chemicals, contaminated water, cuttings, sediment) is safely contained. Tools such as drill pipe with drill bits, casing, and other tools are conveyed through the marine riser.

Offshore drilling may face challenging conditions, such as hurricanes, and the marine risers may be damaged during offshore operations by downhole drilling or construction components. Damaged marine risers pose safety issues to the drilling operation and can cause pollutions to the environment. Therefore, proper inspection on a regular basis is crucial to the integrity of the risers as well as the entire offshore operation.

A conventional method of inspecting marine risers that are deployed is to pull riser sections and disconnecting the pulled riser sections from the marine riser. Upon being pulled out and disconnected, they may be transported from the floating unit to a land-based facility for inspection. Disconnecting and transporting riser sections is expensive and time consuming in itself as well as the loss of production due to the interruption. While the disconnected riser sections may be inspected on the floating unit, such inspection on the floating unit may be expensive, time consuming, and may not be practical due to safety and space considerations.

What is needed is an improved inspection method and system for inspecting marine risers while the marine risers are deployed.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

An embodiment of an inspection method for a marine riser deployed from a floating unit and connected to an LMRP and a BOP stack includes performing a first riser inspection with an inspection tool where the marine riser is in an unconnected well configuration. The inspection tool includes an ultrasonic transducer device. The first riser inspection includes conveying the inspection tool in an internal diameter of the marine riser, detecting information on the marine riser with the inspection tool while conveying the inspection tool through the marine riser, and collecting data with the inspection tool corresponding to the information detected by the inspection tool.

In one embodiment, the method further comprises: after performing the first inspection, connecting the marine riser, LMRP and BOP stack to a first wellhead for operations like drilling, completion, production or abandonment; disconnecting the marine riser, LMRP, and BOP stack from the first wellhead after the operation is completed; and performing a second riser inspection with the inspection tool with the marine riser in the unconnected well configuration, and the second riser inspection comprises: (i) conveying the inspection tool in the internal diameter of the marine riser; (ii) detecting information on the marine riser with the inspection tool while conveying the inspection tool through the marine riser; and (iii) collecting data with the inspection tool corresponding to the information detected by the inspection tool.

In other words, the inspection method of this disclosure is performed when the marine riser/LMRP/BOP stack is not connected to a wellhead, such that there is no hydrocarbons or other production fluids or muds inside the risers, which allows for more accurate inspection of the riser condition. Additionally, performing inspection while the marine risers/LMRP/BOP stack are not connected to a wellhead will prevent unnecessary actuation of the LMRP or unmethodically actuating the rams on a BOP.

In one embodiment, the inspection tool is connected to a controller through a slickline or a wireline. When the inspection tool is connected to the controller through a slickline, the inspection tool is powered by an internal battery. When the inspection tool is connected to the controller through a wireline, the inspection tool can be powered through the wireline.

In one embodiment, the inspection tool comprises a memory unit for storing the data collected during inspection. If the inspection tool is conveyed through a slickline, the inspection data stored on the memory unit can be retrieved after the inspection is completed. Alternatively, if the inspection tool is conveyed through a wireline, the inspection data can be stored on the memory unit while also be transmitted to a controller in real time.

In one embodiment, the inspection tool can further comprise a camera system that takes images or videos during the riser inspection. The captured images or videos can be stored in a memory unit inside the camera system. Similar to the inspection tool discussed herein, if the inspection tool along with the camera system is conveyed through a wireline, the captured images and/or videos can be transmitted to a controller in real time; if the inspection tool and camera system is conveyed through a slickline, the captured images and/or videos can be stored in the memory unit and retrieved when the inspection is completed.

As used herein, "BOP" or a blowout preventer refers to a specialized valve or similar mechanical device located at the top of a well that is used to seal, control and monitor oil and gas wells to prevent blowouts especially during drilling operations. By closing this valve, the drilling crew can regain control of the well, and procedures can be initiated to increase the mud density until it is possible to open the BOP and retain pressure control of the formation.

As used herein, "marine riser" refers to a large diameter pipe that connects the subsea BOP stack to a floating surface rig to take mud returns to the surface. It is a conduit that provides a temporary extension of a subsea oil well to a surface drilling facility.

As used herein, "LMRP," or lower marine riser package, refers to a mechanical device used to protect a subsea oil well. Typically, a LMRP comprises a connector to the subsea oil well, a series of safety valves and a connection point at the top for connection to the riser pipe.

As used herein, "slickline" refers to a single-strand, non-electric cable that is used to run a variety of tools down into the wellbore for different purposes and retrieve the tools after the operation is completed.

As used herein, "wireline" refers to electric cables that transmit data about the well. Wirelines can be single-strand or multi-strands, and it is used for conveyance for the acquisition of subsurface petrophysical and geophysical data and the delivery of well construction services such as pipe recovery, perforating, plug setting and well cleaning and fishing.

As used herein, "memory unit" refers to an internal storage medium for storing data. The memory unit can be built-in or removable.

As used herein, "ultrasonic transducer" or "ultrasonic apparatus" refers to transducers that emit an ultrasonic, acoustical signal through the seawater in the annular clearance inside the marine riser and into the wall thereof, and detect a return acoustical signal from the wall of the riser to determine wall thickness. By lowering the inspection tool down the internal diameter of marine risers, one can measure the wall thickness along the longitudinal axis and determine whether there is a defect in the riser that requires service or replacement. The same principle can also be used to detect whether the shape and integrity of the risers.

As used herein, "unconnected configuration" or "unlatched" configuration refers to the configuration where the marine rise, the LMRP and the BOP stack are not connected to a wellhead.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

In general, the present disclosure relates to an inspection system and method utilizing an inspection tool to inspect a marine riser, also sometimes referred to as a drilling riser or riser, deployed from a floating unit. The inspection tool is conveyed through an internal diameter of the deployed marine riser. The inspection tool includes an ultrasonic apparatus, and in some embodiments further includes a camera system. The deployed marine riser may be connected to a lower marine riser package ("LMRP") with the LMRP releasably connected to a blowout preventer ("BOP"). In some embodiments of the inspection method, the inspection method includes performing an inspection while the deployed marine riser, LMRP and releasably connected BOP are in an unlatched configuration. When in the unlatched configuration, the marine riser, LMRP, and BOP are not connected to a wellhead.

Figure 1:
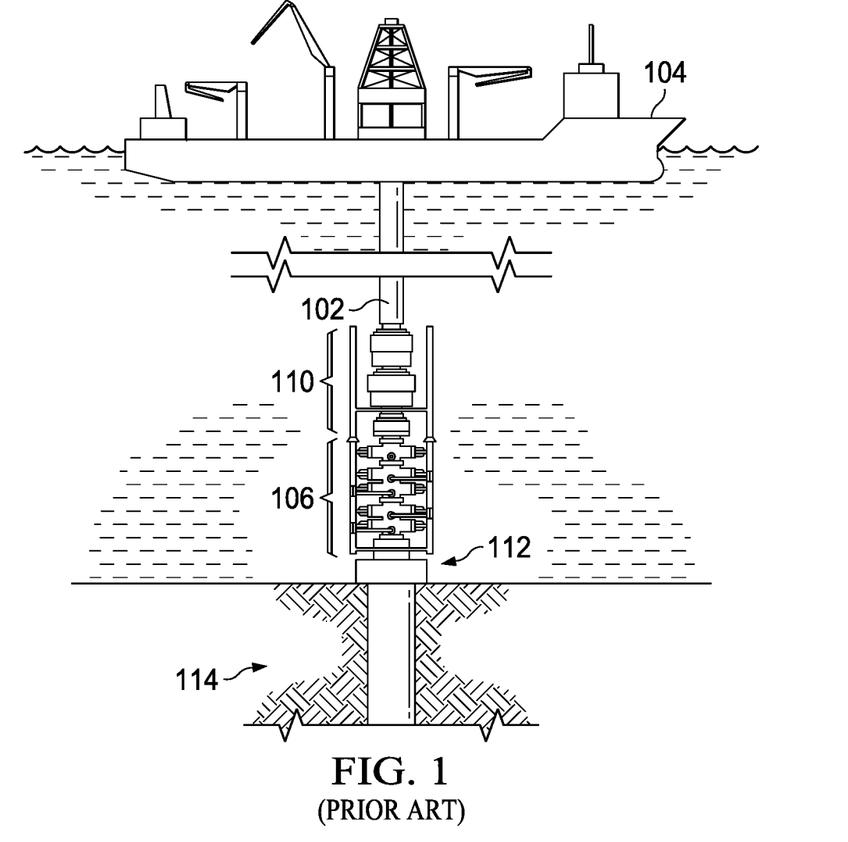
FIG. 1 is a side view of a prior art floating unit having a deployed drilling marine riser.

Referring to FIG. 1, a prior art deployed marine riser 102 extending between a floating unit 104 and a BOP stack 106 is shown. Marine riser 102 is connected at a distal end to a lower marine package 110 that releasably connects to the BOP stack 106. BOP stack 106 may include multiple rams within a BOP to ensure pressure control of a well and is shown connected to a subsea wellhead 112. Subsea wellhead 112 connects to a subterranean well 114. Floating unit 104 may be a mobile offshore drilling unit.

Figure 2:
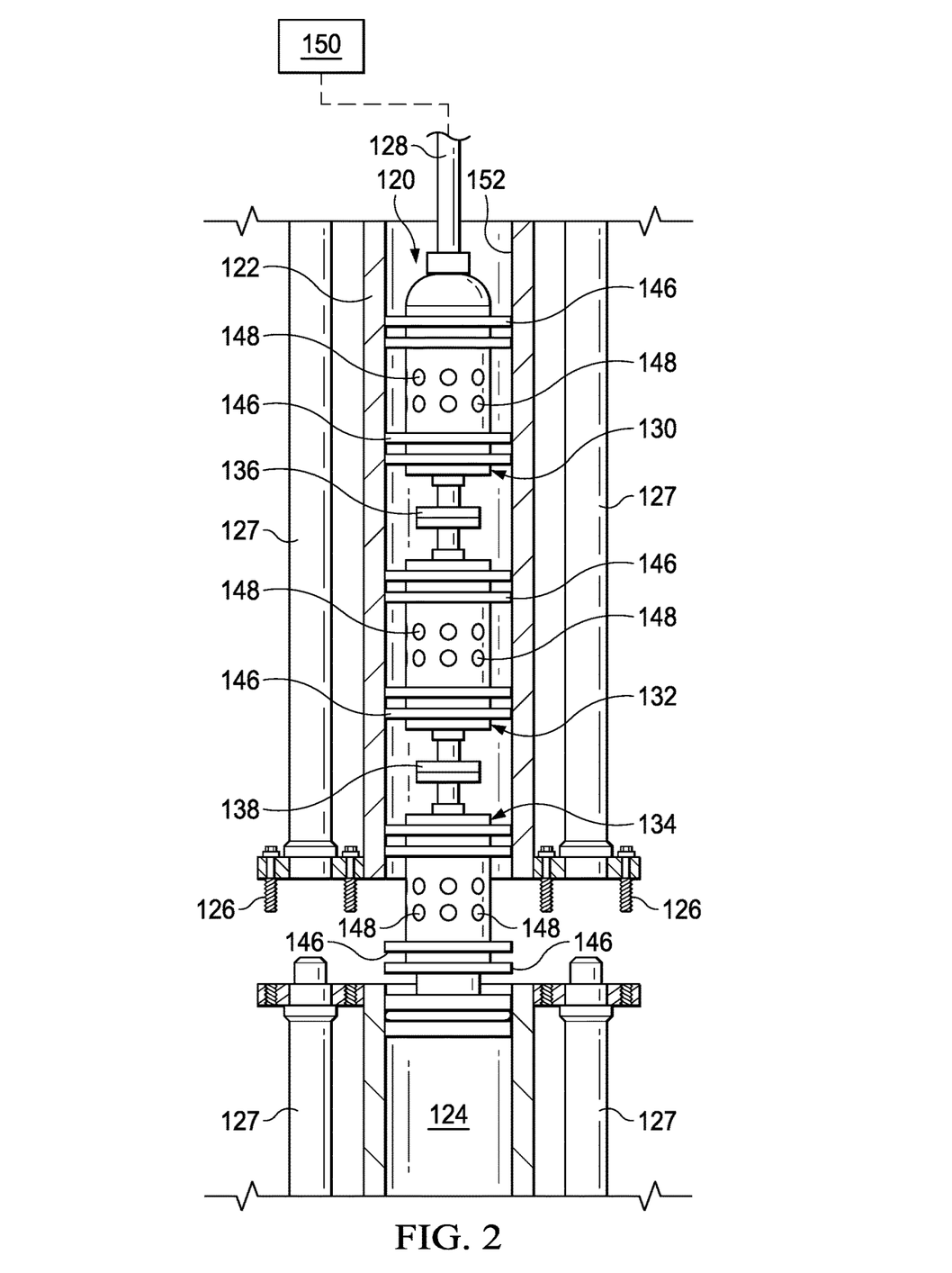
FIG. 2 is a schematic diagram of an inspection tool disposed in a first marine riser section and a second riser section of a marine riser in accordance with embodiments of the present disclosure.

Referring to FIG. 2, an embodiment of the present disclosure is shown with an inspection tool 120 disposed in a first marine riser section 122 and a second riser section 124 of the marine riser 102. Riser sections 122, 124 may be bolted together with bolts 126 and may be of lengths such as seventy-five foot to ninety foot. Riser sections 122, 124 are shown detached in FIG. 2 to help illustrate the marine riser 102. Auxiliary lines 127 are disposed outside of pipe wall of the marine riser 102.

A conveyance line 128 is connected to the inspection tool 120 to convey the inspection tool 120 in the marine riser 102. Conveyance line 128 may be configured to provide power to the inspection tool 120 in some embodiments. Conveyance line 128 may be configured to provide communications, such as data communications, between the inspection tool 128 and the floating unit 104 in some embodiments. Conveyance line 128 may be formed by an E-Line or a slickline and is configured to convey the inspection tool 120 through the marine riser 102 as the inspection tool 120 is tripped between the floating unit 104 and above the LMRP 110. Conveyance line 128 may be formed by an E-Line configured to provide power and communications between the inspection tool 120 and the floating unit 104 while the inspection tool 120 is conveyed in the marine riser 102. Conveyance line 128 also may be formed by a slickline that is not configured to provide power and communications to the inspection tool 120 suspended from the slickline.

Inspection tool 120 may have multiple segments and the embodiment of the inspection tool 120 shown in FIG. 2 is shown with a first tool segment 130, a second tool segment 132, and a third tool segment 134. Tool segments 130-134 are coupled together end-to-end by a first coupler 136 and a second coupler 138 to form an elongated inspection tool 120. Each tool segment 130-134 includes a housing and the housing may have a cylindrical shape. Stabilizing devices 146 may extend radially outwards from the housing of the tool segments 130-134 and may be configured to center the inspection tool 120 along a lengthwise axis in the marine riser 102. More specifically, each stabilizing device 146 extends around the circumference of the housing of one of the tool segments 130-134. Each tool segment 130-134 may have multiple stabilizing devices 146 that are spaced apart from one another along a lengthwise axis of each tool segment 130-134.

Figure 10:
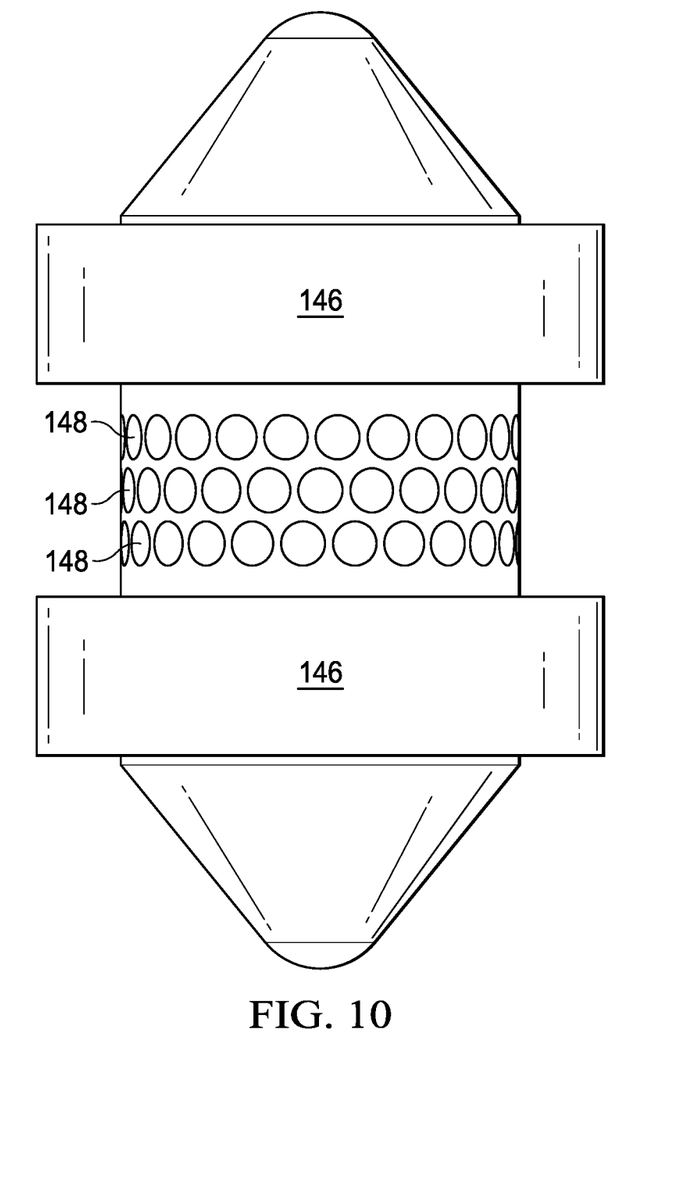
FIG. 10 is a perspective view of a tool segment of the inspection tool in accordance with embodiments of the present disclosure.

Inspection tool 120 embodiments include an ultrasonic apparatus configured to transmit and receive ultrasonic waves during an inspection of the marine riser 102. In some embodiments, the ultrasonic apparatus may be formed by ultrasonic transducers 148 and may be mounted on the outer surface of one or more of the tool segments 130-134. The ultrasonic transducers 148 may be spaced in the middle of each of the tool segments 130, 132, and 134 and be positioned between two spaced-apart rows of the stabilizing devices 146. Another embodiment of a tool segment of an inspection tool with the ultrasonic transducers 148 spaced in the middle of the tool segment and spaced between two spaced-apart rows of the stabilizing devices 146 is shown in FIG. 10. In some embodiments, ultrasonic transducers may be mounted in the inside of the housing of the tool segments 130-134.

In some embodiments, the inspection tool 120 may further include a camera system (not shown). The camera system can be mounted on the inspection tool not exceeding the diameter of the stabilizing devices. The camera system may be configured to inspect the marine riser as the inspection tool 120 is conveyed in the marine riser 102.

Ultrasonic transducers 146 generate data corresponding to the condition of the marine riser 102 during the conveyance of the inspection tool 120 through the marine riser 102. The camera system, not shown, used in some embodiments of the inspection tool 120 also may generate data corresponding to the condition of the marine riser 102 during the conveyance of the inspection tool 120 through the marine riser 102. The data generated by the inspection tool 120 may be stored on a memory unit, not shown, on the inspection tool 120 when deployed on Slickline.

Data from the inspection tool 120 may be downloaded to a controller 150. Controller 150 may be a laptop computer or other computer and may be located above surface on the floating unit 104. For example, data from the memory unit on the inspection tool 120 may be connected to the controller 150 when the inspection tool 120 is tripped out of the marine riser 102. The memory unit may then be connected to the controller 150 to download data from the inspection tool 120. The data from the inspection tool 120 may be processed by the controller 150 to provide information on the inspection of the marine riser 102 and any defects of the marine riser 102. Where an E-Line is used to convey power to the inspection tool 120, data from the inspection tool 120 may also be transmitted via the E-Line from the inspection tool 120 deployed in the marine riser 102 to the controller 150.

Where an E-Line is used to convey the inspection tool 120, the camera system may be configured to cross validate data that is being received by the ultrasonic transducers 146 in real time. Collection of data from inspection tool 120 provides a method of logging information on the condition of the marine riser 102, including any defects in the marine riser 102. Logging information on the conditions of the marine riser 102 using the inspection tool 120 provides crucial data on the internal and external part of each section of the marine riser 102.

Inspection tool 120 is configured to be conveyed, as shown in FIG. 2, through the internal diameter of the marine riser 102 to inspect the pipe wall 152 of the marine riser 102. In some embodiments, an inspection tool may be configured to be conveyed through auxiliary lines 127 to inspect the auxiliary lines 127 of the marine riser 102.

Figure 3:
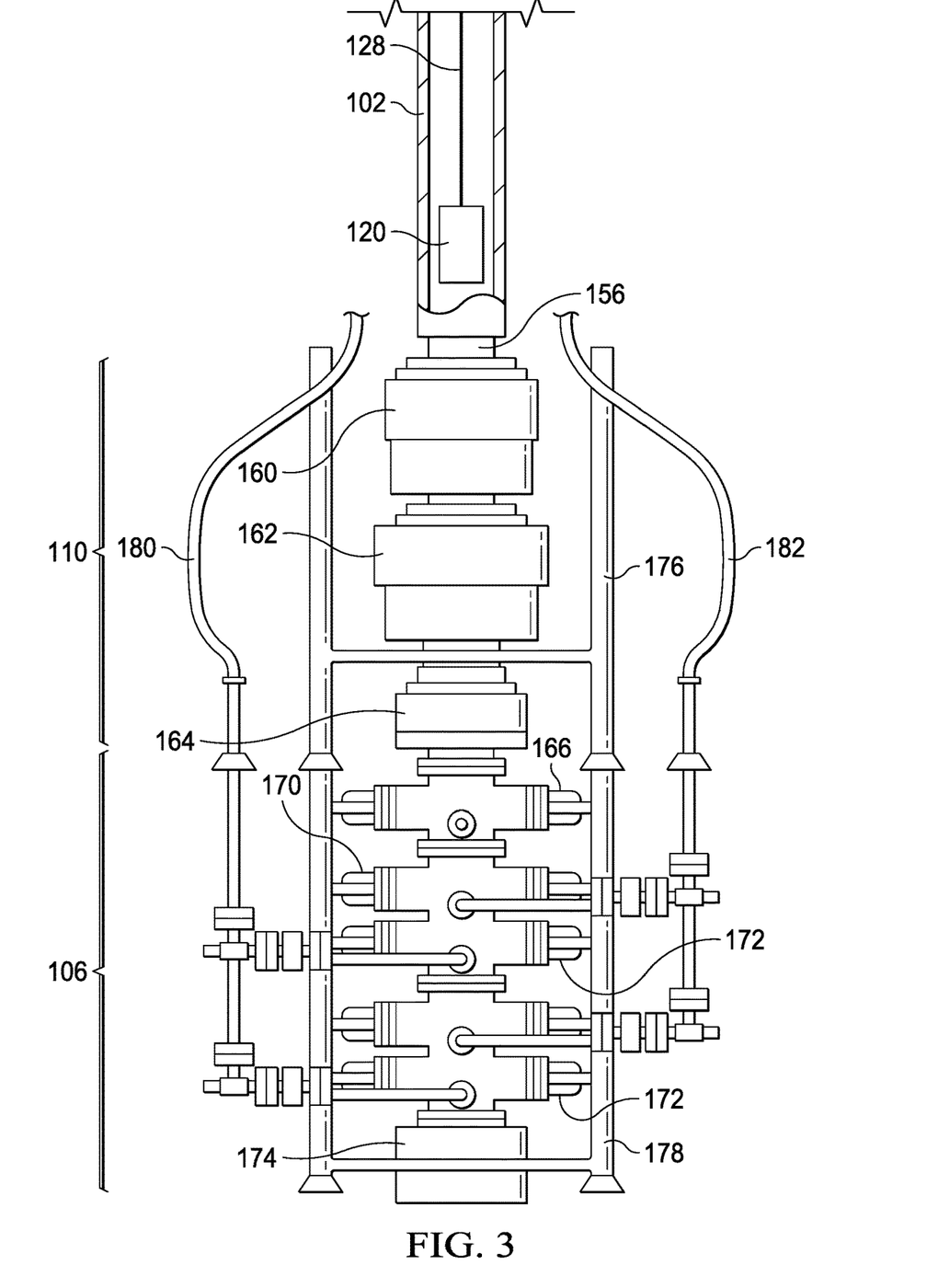
FIG. 3 is a side view of an LMRP and a BOP stack connected to the marine riser and with the inspection tool in the marine riser in accordance with embodiments of the present disclosure.

Referring to FIG. 3, a distal end of the marine riser 102 is shown connected to the LMRP 110 and the LMRP 110 is releasably connected to the BOP stack 106. LMRP 110 includes a marine riser connector 156, an upper annular BOP 160, a lower annular BOP 162, and an LMRP to BOP connector 164 for releasably connecting to the BOP stack 106. BOP stack 106 includes a blind shear ram 166, casing shear ram 170, pipe rams 172, and BOP to wellhead connector 174. A first frame structure 176 extends around the periphery of the LMRP 110 and a second frame structure 178 extends around the periphery of the BOP stack 106. A kill line 180 and a choke line 182 extend to valves on the BOP stack 106 for use in operating the BOP stack 106. Tests of the BOP stack 106 may be periodically performed to determine operating status of the BOP stack 106.

Inspection tool 120 is configured to be conveyed, as shown in FIG. 3, through the internal diameter of the marine riser 102 to the connection of the marine riser 102 to the top portion of the LMRP 110.

Referring to FIGS. 4-8, an embodiment of an inspection method may be performed to inspect the marine riser 102 as the marine riser 102 is moved from one wellhead to another wellhead. As described below, the marine riser 102 may be moved from a first well 184, to a second well 186, and to a third well 188 that extends into the sea floor 192. First well 184 includes a first wellhead connector 194, second well 186 includes a second wellhead connector 196, and the third well 188 includes a third wellhead connector 198. Each of the wells 184-188 include a production tubing 202 and a well isolation barrier 204. Well isolation barrier 204 may be formed by a mechanical barrier or a cement plug.

Those skilled in the art will appreciate that a subsea tree is not always present when conducting well work. As such, if there is a subsea tree on the wellhead, the tree may provide the well barriers above the wellhead and not in the production tubular. When the riser inspection method is performed where a well barrier is in place in the subsea tree or the production tubular, there is the benefit that the riser inspection method does not need to intervene or interfere with the well barriers during the performance of the riser inspection.

Figure 4:
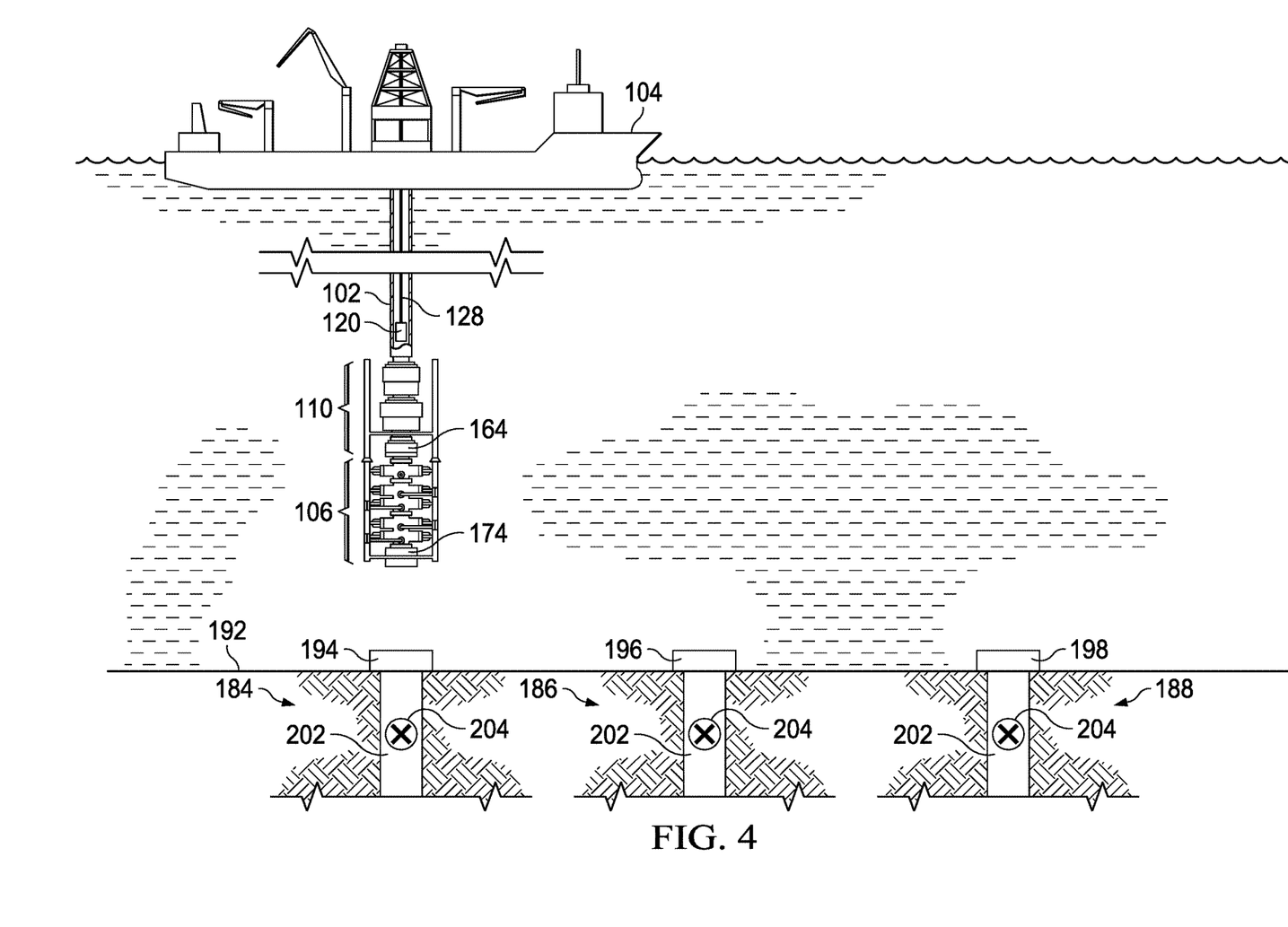
FIGS. 4-8 are schematic diagrams illustrating a sequence of riser inspections being performed on a deployed marine riser that is connected and disconnected from a plurality of wells in accordance with embodiments of the present disclosure.

Referring to FIG. 4, the floating unit 104 is positioned proximate to a first well 184. Marine riser 102 is deployed in the sea water with the LMRP 110 connected to the distal end of the marine riser 102. LMRP to BOP connector 164 releasably connects the BOP stack 106 to the LMRP 110. BOP to wellhead connector 174 is unconnected to a wellhead so that the marine riser 102 is in an unconnected wellhead configuration. In some embodiments, the LMRP 110, BOP stack 106, and the BOP to wellhead connector 174 are positioned above a first wellhead connector 194 of the first well 184, as shown in FIG. 4. Marine riser 102 may be filled with sea water and the sea water acts as a conductor for ultrasonic waves used by the inspection tool 120 during an inspection. In some embodiments, the inspection tool 120 may have air-coupled ultrasonic transducers.

With the marine riser 102 in the unconnected wellhead configuration, a first riser inspection may be performed while the marine riser unit is disconnected from the first well 184 and before connecting the marine riser unit to the first well. Inspection tool 120 may be conveyed via the conveyance line 128 into the marine riser 102 from the floating unit 104. Inspection tool 120 may be tripped into the marine riser 102 and above the connection of the marine riser 102 to the LMRP 110. As the inspection tool 120 travels in the marine riser 102 either upwards or downwards, the ultrasonic transducers 148 transmit and receive ultrasonic waves and data is collected by the inspection tool 120 corresponding to the received ultrasonic waves. Data collected may be stored in a memory unit on the inspection tool 120 for later retrieval when the inspection tool 120 is conveyed to the surface or transmitted via the conveyance line 128 in real time to the controller 150 (in FIG. 2) located above surface on the floating unit 104 or at an onshore facility. An inspection of the marine riser 102 may be completed after enough data has been received by the inspection tool 120 and the data has been processed by the controller 150 to provide information on the condition of the marine riser 102.

Controller 150 may output information on defects in one or more riser sections of the marine riser 102. In some embodiments, controller 150 may identify riser sections recommended for replacement before further use of the marine riser 102 or replacement after a determined date or replacement based on other criteria. Additional inspections of the deployed marine riser 102 may be performed by the inspection tool 120 after replacement of one or more riser sections based at least in part on the inspection of the deployed marine riser 102 with the inspection tool 120.

Figure 5:
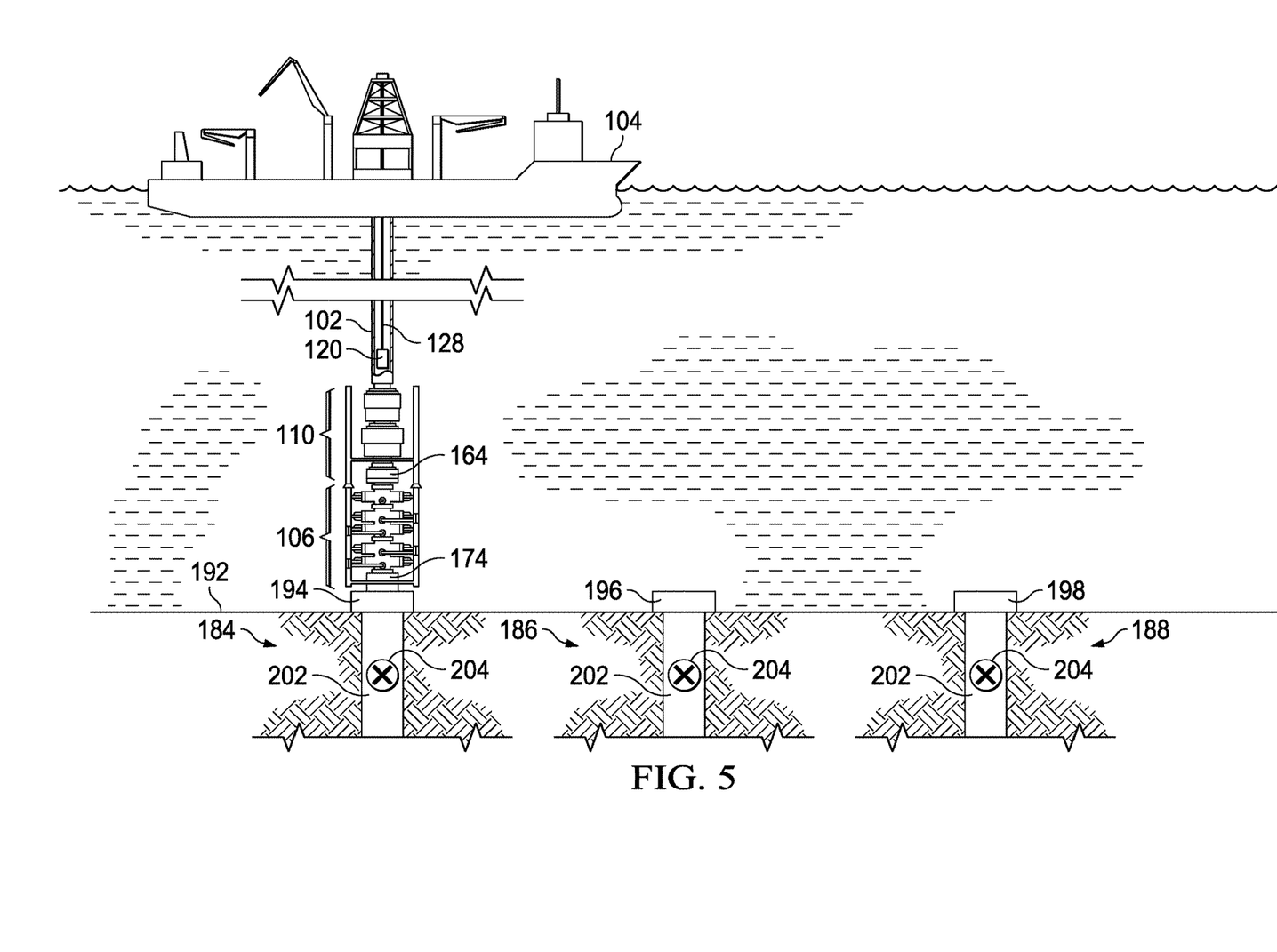

Referring to FIG. 5, after inspection of the marine riser 102, as described with respect to FIG. 4, BOP to wellhead connector 174 may be connected to the first wellhead connector 194 to place the marine riser 102 in the wellhead connection configuration. Well isolation barrier 204 may be in an isolation position before connecting the BOP to wellhead connector 174 to the first wellhead connector 194. Performing a riser inspection before connecting the marine riser 102 to the first well 184, as described with respect to FIG. 4, provides the benefit of reducing the need to perform the riser inspection when the marine riser 102 is connected to the first well 184, which is required before the beginning the operation on the first well 184. By performing riser inspections while the marine riser 102 is unconnected to a well, it ensures that inspections on the marine riser 102 do not interfere with well access operations such as drilling, completions, recompletions, workovers, and plug and abandon operations. This helps prevent the riser inspections from negatively impacting the control of a volatile well that has a breached BOP on a wellhead. In addition, riser inspections when performed when the marine riser is not connected to a well do not cause unneeded actuation or wear and tear on safety critical equipment such as the LMRP or BOP.

After well access operations have been performed on the first well 184 while the marine riser 102 is attached to the first well 184, the marine riser 102, LMRP 110, and the BOP stack 106 are disconnected as a marine riser unit from the first wellhead 194.

In some embodiments, the drilling marine riser 102, LMRP 110, and the BOP stack 106 form a unit that is sequentially connected to multiple wells while being deployed by the floating unit 104, sometimes referred to as a well hop. A riser inspection may be performed before the marine riser 102, LMRP 110, and the BOP stack 106 are connected to each well. For example, a first riser inspection is performed before connecting the marine riser 102, LMRP 110, and the BOP stack 106 to the first well 184. A second riser inspection is performed after disconnecting the marine riser unit and before connecting the marine riser unit to the second well 186.

Figure 6:
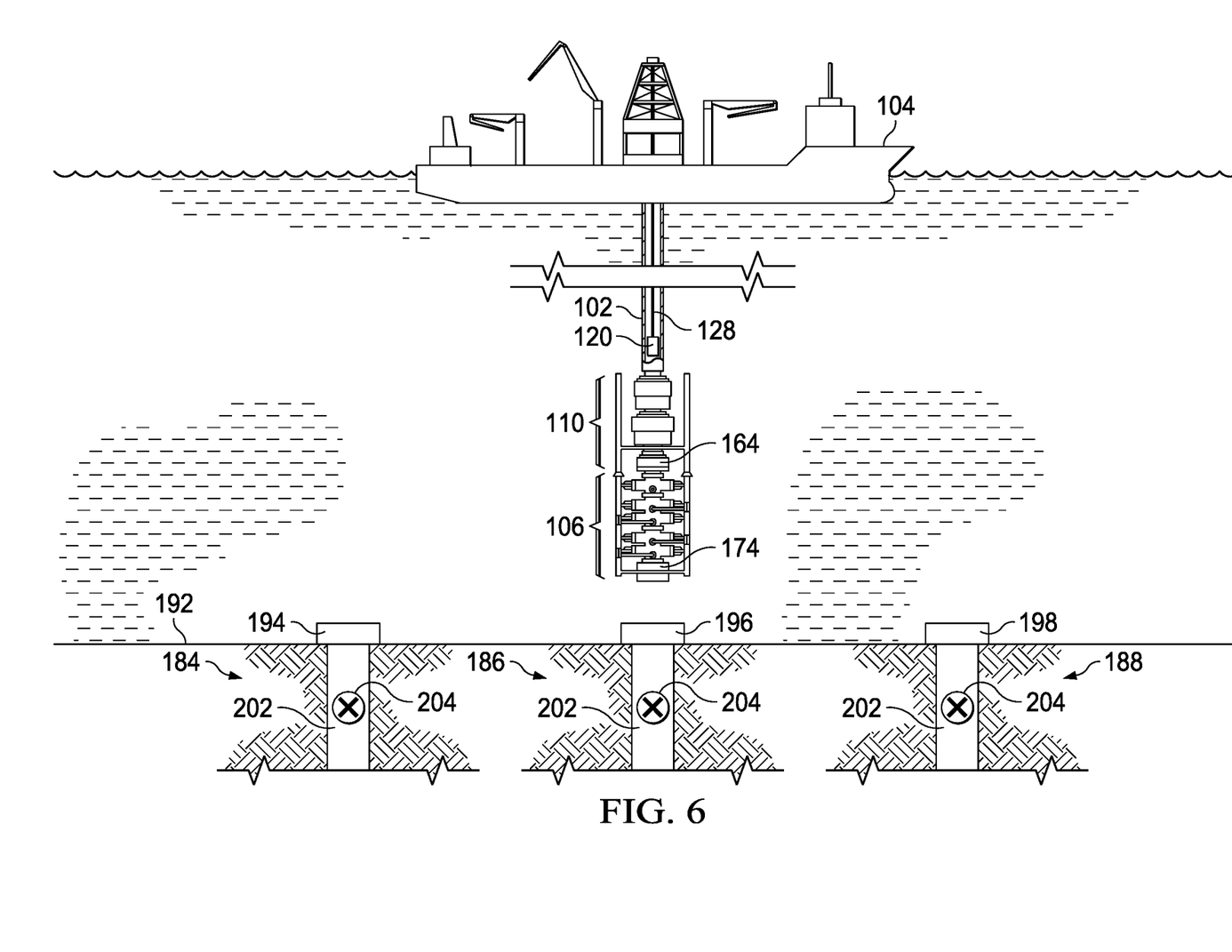

Referring to FIG. 6, after the marine riser unit formed by the marine riser 102, LMRP 110, and the BOP stack 106 has been disconnected from the first wellhead 194, a second inspection of the marine riser 102 may be performed. The deployed marine riser 102 may be filled with sea water and the second riser inspection is performed. The second inspection may be performed in a manner as described with respect to the first riser inspection performed before the marine riser 102 was connected to the first well 184. In this manner, the first riser inspection and the second riser inspection are performed while the marine riser unit is deployed from the floating unit 104. Floating unit 104 may move the deployed marine riser unit from the first well 184 to the second well 186.

Figure 7:
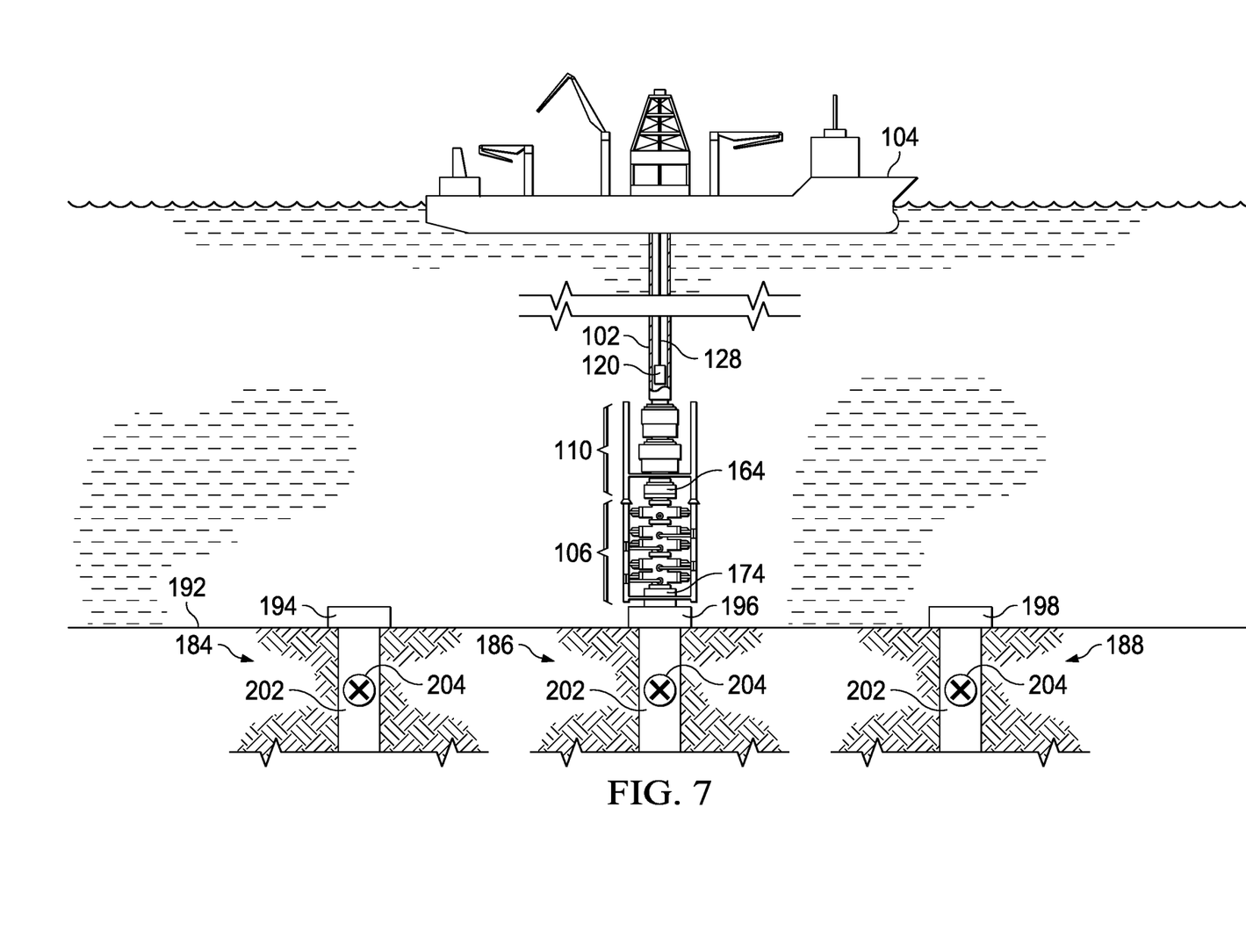

Referring to FIG. 7, after the second inspection of the marine riser 102, as described with respect to FIG. 6, BOP to wellhead connector 174 may be connected the second wellhead connector 196 to place the marine riser 102 in the wellhead connection configuration. Well isolation barrier 204 may be in an isolation position before connecting the BOP to wellhead connector 174 to the second wellhead connector 196. Performing a second riser inspection before connecting the marine riser 102 to the second well 186, as described with respect to FIG. 6, provides the benefit of reducing the need to perform the riser inspection when the marine riser 102 is connected to the second well 186, which saves time before beginning the operation on the second well 186. After well access operations have been performed on the second well 186 while the marine riser 102 is attached to the second well 184, the marine riser unit formed by the marine riser 102, LMRP 110, and BOP stack 106 are disconnected as a marine riser unit from the second wellhead 196.

Figure 8:
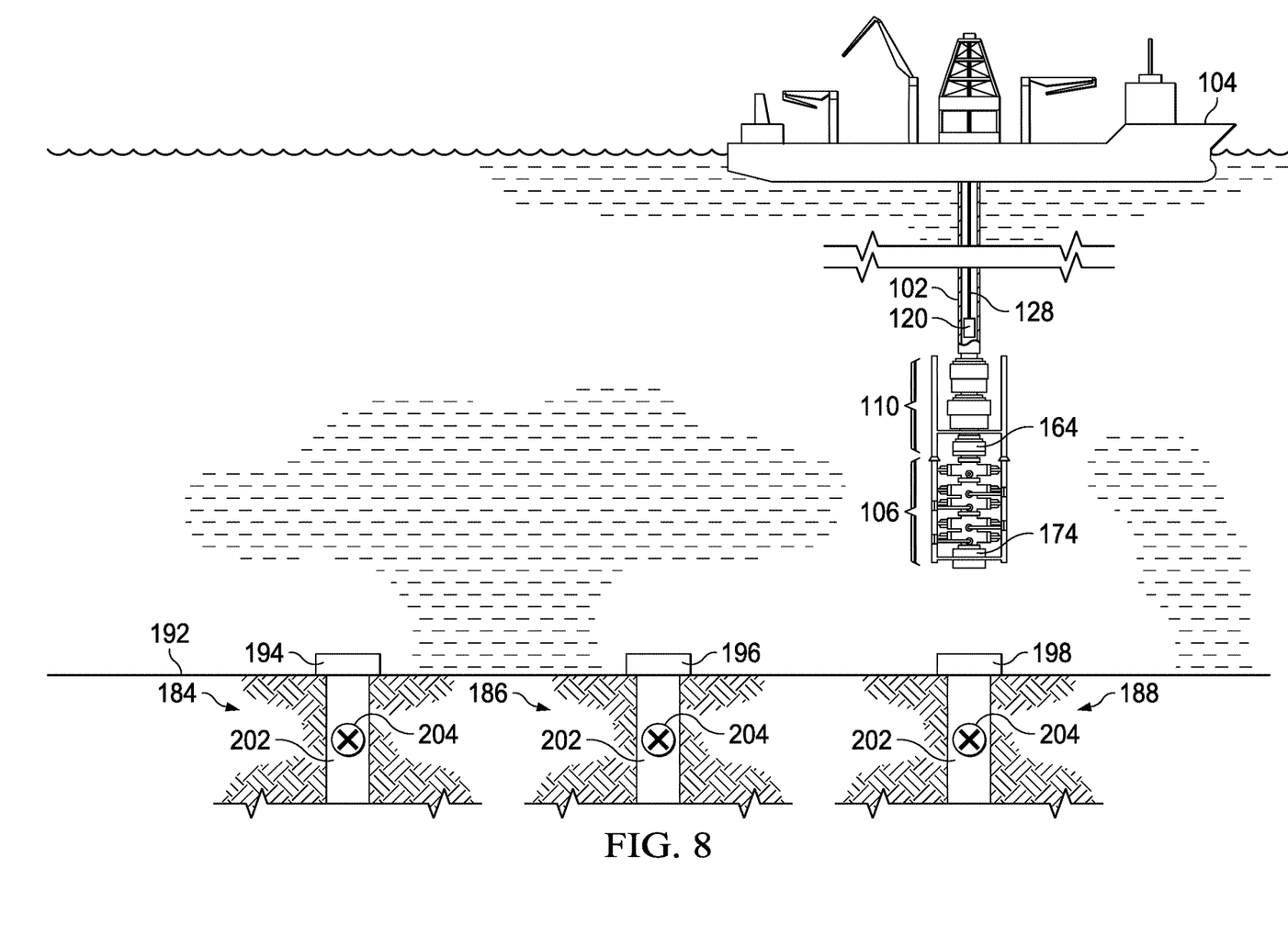

Referring to FIG. 8, after the marine riser unit formed by the marine riser 102, LMRP 110, and the BOP stack 106 has been disconnected from the second wellhead 196, a third inspection of the marine riser 102 may be performed. The deployed marine riser 102 may be filled with sea water and a third riser inspection is performed. The third inspection may be performed in a manner as described with respect to the first riser inspection and the second riser inspection. In this manner, the first riser inspection, second riser inspection, and third riser inspection are performed while the marine riser unit is deployed from the floating unit 104. Floating unit 104 may move the deployed marine riser unit from the first well 184 to the second well 186 and from the second well 186 to the third well 188. After the third inspection of the marine riser 102, as described with respect to FIG. 6, BOP to wellhead connector 174 may be connected to the third wellhead connector 198 to place the marine riser 102 in the wellhead connection configuration. Testing in this manner provides repeatable and quantifiable data of a drilling riser before and after well access operations—in a well hop or non-well hop scenario—which allows for data to be overlapped and compared to more swiftly detect anomalies of the riser's condition. Additionally, performing riser inspection during the time the marine risers are not in operation saves time by not having to wait for the risers to be inspected after connecting to the wellheads. The data collected while the marine risers are disconnected from the wellhead is also more accurate without the interference of hydrocarbons in the risers.

Figure 9:
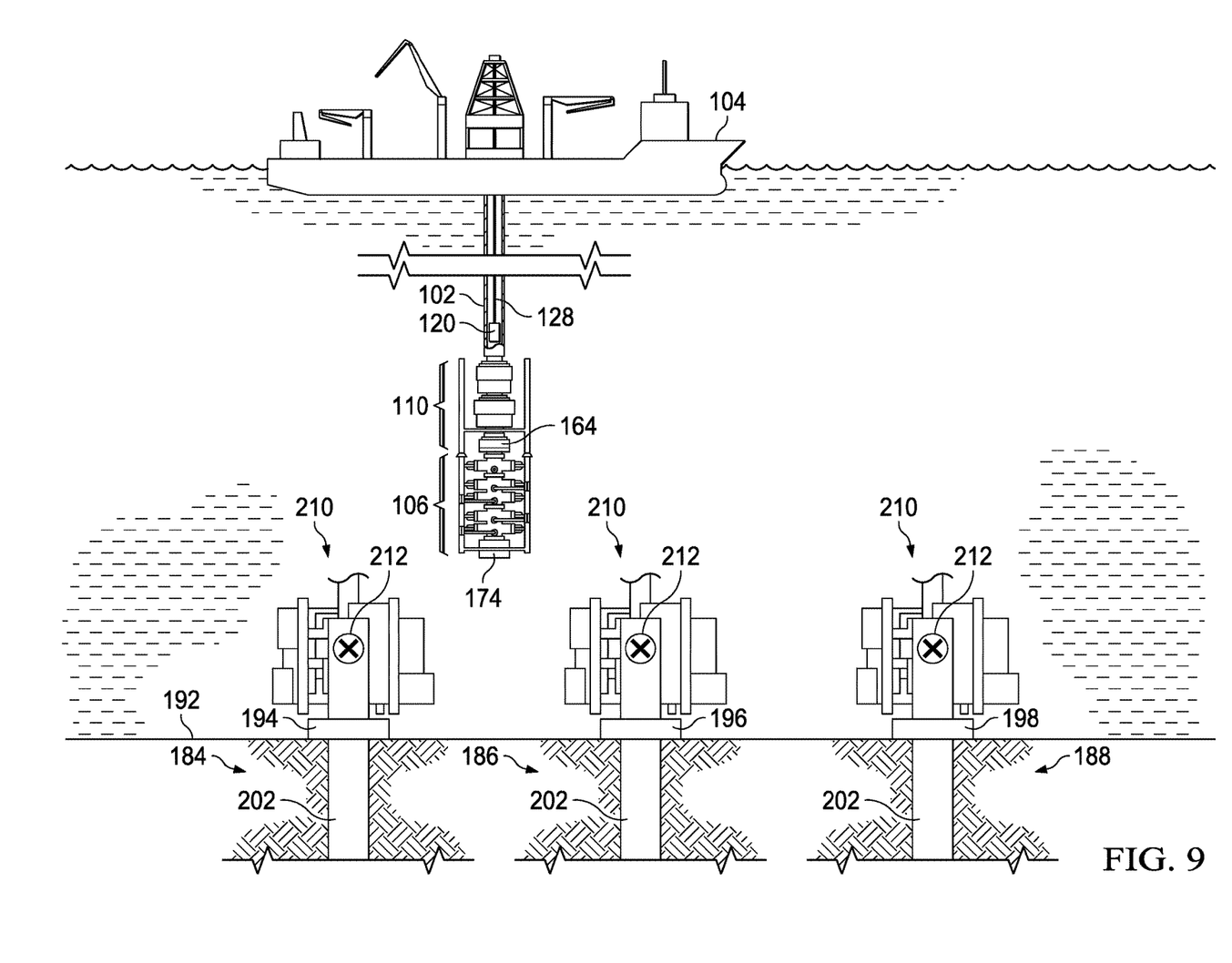
FIG. 9 is a schematic diagram illustrating a riser inspection being performed where the wellhead connectors are connected to subsea trees in accordance with embodiments of the present disclosure.

Referring to FIG. 9, embodiments of the riser inspection method described with respect to FIGS. 4-8 may be performed when a well has been completed and subsea trees 210 have been installed on the wellhead connectors 194-198. Subsea trees 210 are installed to route produced oil from the wells 184-188. Subsea trees 210 include well isolation barriers 212 that are configured to provide a long-term isolation barrier on the subsea trees 210. Well isolation barriers 212 may be formed by gate valves and plugs. More specifically, the subsea trees 210 may be formed by vertical subsea trees with the wellhead isolation barriers 212 formed by gate valves. Subsea trees 210 may be formed by horizontal subsea trees with the wellhead isolation barriers 212 formed by wireline plugs. Wellhead isolation barriers 212 are within the subsea trees 210 and above the wellhead connectors 194, 196, 198. Oil may be produced through a production wing valve within each of the subsea trees 210 and out to a flowline. Production tubing 202 for each of the wells 184, 186, 188 do not include a wellhead isolation barrier and is configured to allow oil to flow through and out of the subsea tree 210.

Well isolation barriers may be provided in a production tubing for different reasons. At times a subsea tree will not be present at a wellhead connector, especially if the subsea tree must be retrieved to re-enter, leading to barriers being placed in the production tubular. If a subsea tree needs to be repaired due to it being faulty, the trees need to be recovered and barriers in the production tubular may be needed. If wireline must enter the well, for example, a subsea tree may require opening the gate valves or retrieving barrier plugs in the subsea tree via wireline to allow for mechanical entering of the well to operate or intervene with the components inside the production tubular. Where valves have been opened or plugs have been removed, the valves and plugs will have to be reset. After the well barriers in the tree have been actuated by human intervention and the BOP is no longer utilized, testing may then be performed to prove that the valves or plugs isolate and seal the well.

In some embodiments, the marine riser can be tested in a preventative manner when deployed in any open water, without having to subsequently connect to a wellhead. In such embodiments for a non-well hop scenario, the marine riser may be inspected freely—in the absence of the wellhead—from a floating unit The methods described herein allows for the inspection tool to be swiftly deployed on slickline or E-line to ensure that marine risers are in optimal condition. When deployed on slickline, the inspection tool can log all the marine risers' data via a self-contained memory logging unit that is powered by an internal battery, the data from the inspection tool is analyzed upon retrieval of the inspection tool on the surface. Alternatively, the inspection tool can log with live telemetry and power from a wireline, also referred to as an E-line system, or an umbilical. With live telemetry a controller, such as topside control and logging computer unit, can focus on contentious areas, with the inclusion of a camera system to cross validate data that is being received in real time. The methods of logging provide crucial data on the internal and external part of each section of a riser.

Because the inspection tool inspects and detects metal loss, cracks, and damage mechanisms on risers that are anomalous—risers can be proactively pulled out of service while offshore. By doing this, a potential failure, breach, or leak within risers that would otherwise lead to pollution, can be prevented, to ensure that a well does not pollute the environment in a volatile fashion. When the threat is not as immediate, the collected data empowers a company, or companies, that have a commercial interest in well entry operations, to plan at which point any riser section is to be methodically pulled, in the future.

Moreover, this method and inspection tool achieve full active coverage (circumferential and axial) of the risers upon entering the top most section of the riser entry point, without having to retrieve the drilling equipment or risers. The inspection tool covers the entire distance of the risers when deployed from the floating unit, until reaching the topmost porting of the LMRP or BOP, prior to tripping back to the floating unit for retrieval. The inspection tool's inherent advantage is that the internal radius and outer radius of the risers are simultaneously inspected when the device is deployed in the risers.

In embodiments of the present disclosure, the risers are inspected in situ, or in other words when the BOP and associated equipment are connected as one assembly while offshore or in an open water setting. As such, performance of the riser inspection methods of the present disclosure do not interfere with any well activities, and therefore, these methods are employed once the BOP is safely unlatched from the wellhead and the well is entirely shut in and sealed from the ambient environment.

It is at this point that the safe testing of the risers can take place, as the inspection will not be executed while the BOP is exposed to a live and active well. Furthermore, the inspection tool is not exposed to the temperature and pressure of the well. Seawater provides the acoustic medium to test with the ultrasonic device on the inspection tool, without the presence of gas. It is at this point that the inspection tool is deployed in the risers and subsequently retrieved to the floating unit, after it has concluded its inspection.

Because the BOP is no longer latched onto the wellhead during safety critical operations, there is the option for BOP rams to be closed to conduct an in situ inspection. From a safety standpoint, when the BOP is disconnected from the wellhead the rams' actuation is not a risk to safety critical operations because the BOP is not functioning to seal or contain the well. The risers can be inspected in this backdrop—as the risers will be filled with fluid—before and after operating the rams, thus lending itself greatly to the utilization of the inspection tools with ultrasonic sensors.

In the event inclement weather requires the BOP to latch onto the wellhead to have the riser stable and not swaying in rough sea states such as currents, waves, wind waves, or a heaving body of water, this riser inspection method is a safe means to test without the need to actuate the BOP due to the fact that this method may be performed when barriers are in place in the production tubular or in the subsea tree. Those skilled in the art appreciate that when the riser is connected to the well, there are mechanical devices associated with the riser assembly, such as flex joints, telescopic joints, and tensioners that mitigate rough sea states.

Furthermore, an additional method of inspecting the auxiliary lines that are on the external area of the risers can be realized before the BOP returns to surface. With the BOP rams closed, an alternative inspection tool may be conveyed in the internal diameter of one or more of the auxiliary lines. The alternative inspection tool, including an ultrasonic device, may be conveyed using fluid pressure or a self-propulsion system. In some embodiments the alternative inspection tool may be conveyed by a conveyance line in the internal diameter of an auxiliary line. The alternative inspection tool may have a similar design as the inspection tool described with respect to other embodiments and can be used inspect to inspect auxiliary lines in an in situ manner and while offshore. The bidirectional, alternative inspection tool is pumped down to the BOP from the floating unit through the auxiliary lines, and the valves on the BOP are arranged in a way that allows for the alternative inspection tool to be pumped back towards surface by closing the BOP's rams.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An inspection method of a marine riser deployed from a floating unit and connected to a lower marine riser package (LMRP) and a blow-out prevention (BOP) stack, comprising:
   performing a first riser inspection with an inspection tool where the marine riser is in an unconnected well configuration, wherein the inspection tool includes an ultrasonic transducer device, and the first riser inspection comprises:
   conveying the inspection tool in an internal diameter of the marine riser,
   detecting information on the marine riser with the inspection tool while conveying the inspection tool through the marine riser, and
   collecting data with the inspection tool corresponding to the information detected by the inspection tool, and
   a) after performing the first riser inspection, connecting the marine riser, LMRP, and BOP stack to a first wellhead,
   b) disconnecting the marine riser, LMRP, and BOP stack from the first wellhead, and
   c) performing a second riser inspection with the inspection tool with the marine riser in the unconnected well configuration, and the second riser inspection comprises:
      (i) conveying the inspection tool in the internal diameter of the marine riser,
      (ii) detecting information on the marine riser with the inspection tool while conveying the inspection tool through the marine riser, and
      (iii) collecting data with the inspection tool corresponding to the information detected by the inspection tool.

2. The inspection method of claim 1, wherein the inspection tool is conveyed through a slickline, or a wireline.

3. The inspection method of claim 2, wherein the inspection tool is conveyed through a wireline, and the collected data is transmitted to a controller in real time.

4. The inspection method of claim 3, wherein the inspection tool is powered by the wireline.

5. The inspection method of claim 1, wherein the inspection tool comprises at least one tool segment having a generally cylindrical body and at least one stabilizing device surrounding the cylindrical body, wherein the cylindrical body of said tool segment having a first diameter that is smaller than a second diameter of said stabilizing device, and the second diameter of the stabilizing device being smaller than the internal diameter of the marine riser, and wherein the ultrasonic transducer is located on the outside surface of the cylindrical body of the tool segment.

6. The inspection method of claim 1, wherein the inspection tool is conveyed through a slickline, and the collected data is transmitted to a controller after the inspection is completed.

7. The inspection method of claim 6, wherein the inspection tool is powered by an internal battery.

8. The inspection method of claim 6, wherein the inspection tool comprises a memory unit for storing data collected during inspection.

9. The inspection method of claim 1, wherein the inspection tool further comprises a camera system that takes images or videos during the first riser inspection.

10. The inspection method of claim 1, wherein the inspection tool comprises a plurality of ultrasonic transducer devices located on an outer surface of the inspection tool.

11. The inspection method of claim 10, wherein seawater in the marine riser acts as a conductor through which ultrasonic waves are transmitted and received by the plurality of ultrasonic transducer devices to determine a wall thickness of the marine riser.

12. An inspection method of a marine riser deployed from a floating unit and connected to a lower marine riser package (LMRP) and a blow-out prevention (BOP) stack, comprising:
performing a first riser inspection with an inspection tool where the marine riser is deployed in seawater in an unconnected well configuration such that the marine riser is filled with seawater, wherein the inspection tool includes:
an ultrasonic transducer device,
at least one tool segment having a generally cylindrical body,
a first pair of stabilizing devices surrounding and positioned at one end of the cylindrical body, and
a second pair of stabilizing devices surrounding and positioned at an opposite end of the cylindrical body, wherein the cylindrical body has a first diameter that is smaller than a second diameter of the first and second pairs of stabilizing devices, wherein the second diameter of the first and second pairs of stabilizing devices is smaller than the internal diameter of the marine riser, and wherein the ultrasonic transducer is located on the outside surface of the cylindrical body between the first and second pairs of stabilizing devices, and
wherein the first riser inspection comprises:
conveying the inspection tool in an internal diameter of the marine riser while the marine riser is filled with seawater,
detecting information on the marine riser with the inspection tool while conveying the inspection tool through the marine riser, and
collecting data with the inspection tool corresponding to the information detected by the inspection tool, and after performing the first riser inspection, connecting the marine riser, LMRP, and BOP stack to a first wellhead to perform a first well access operation,
after performing the first well access operation, disconnecting the marine riser, LMRP, and BOP stack from the first wellhead, then
moving the marine riser, LMRP, and BOP stack to a location above a second wellhead,
performing a second riser inspection with the inspection tool with the marine riser in the unconnected well configuration above the second wellhead such that the marine riser is filled with seawater, and wherein the second riser inspection comprises:
conveying the inspection tool in the internal diameter of the marine riser,
detecting information on the marine riser with the inspection tool while conveying the inspection tool through the marine riser, and
collecting data with the inspection tool corresponding to the information detected by the inspection tool.

13. The inspection method of claim 12, wherein the inspection tool is conveyed through a wireline, and the collected data is transmitted to a controller in real time.

14. The inspection method of claim 13, wherein the inspection tool is powered by the wireline.

15. The inspection method of claim 12, wherein the inspection tool is conveyed through a slickline, and the collected data is transmitted to a controller after the first riser inspection or the second riser inspection is completed.

16. The inspection method of claim 15, wherein the inspection tool is powered by an internal battery.

17. The inspection method of claim 16, wherein the inspection tool comprises a memory unit for storing data collected during inspection.

18. The inspection method of claim 12, wherein the inspection tool further comprises a camera system that takes images or videos during the first riser inspection.

19. The inspection method of claim 12, wherein the inspection tool comprises a plurality of ultrasonic transducer devices located on an outer surface of the inspection tool.

20. The inspection method of claim 12, wherein the seawater in the marine riser acts as a conductor through which ultrasonic waves are transmitted and received by the plurality of ultrasonic transducer devices to determine a wall thickness of the marine riser.

* * * * *